Nov. 1, 1938.　　　　J. P. McLARRY　　　　2,134,792
HARVESTER
Filed Nov. 10, 1936　　　2 Sheets-Sheet 1
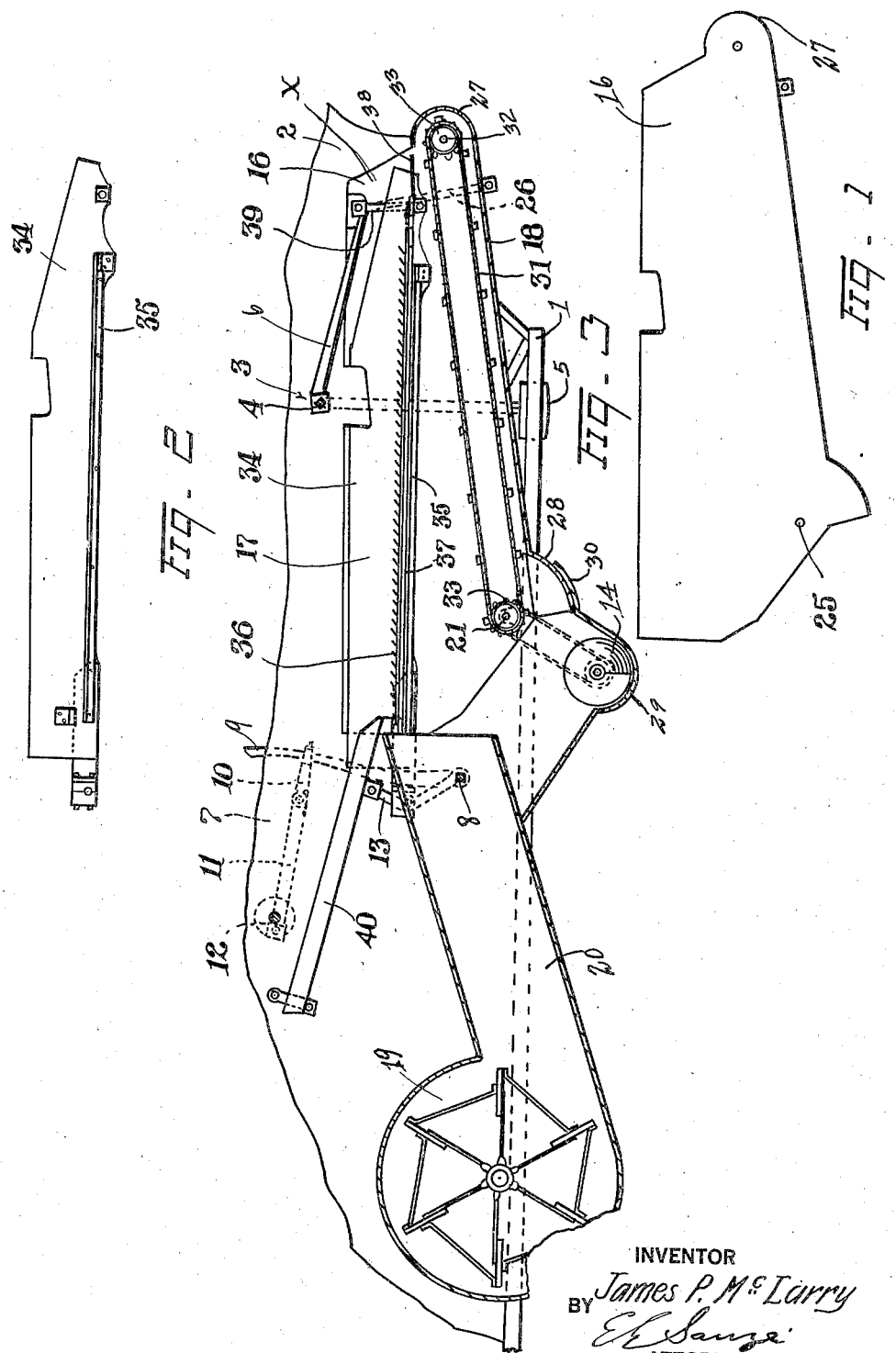
INVENTOR
James P. McLarry
BY
ATTORNEY Nov. 1, 1938.  J. P. McLARRY  2,134,792
HARVESTER
Filed Nov. 10, 1936  2 Sheets-Sheet 2
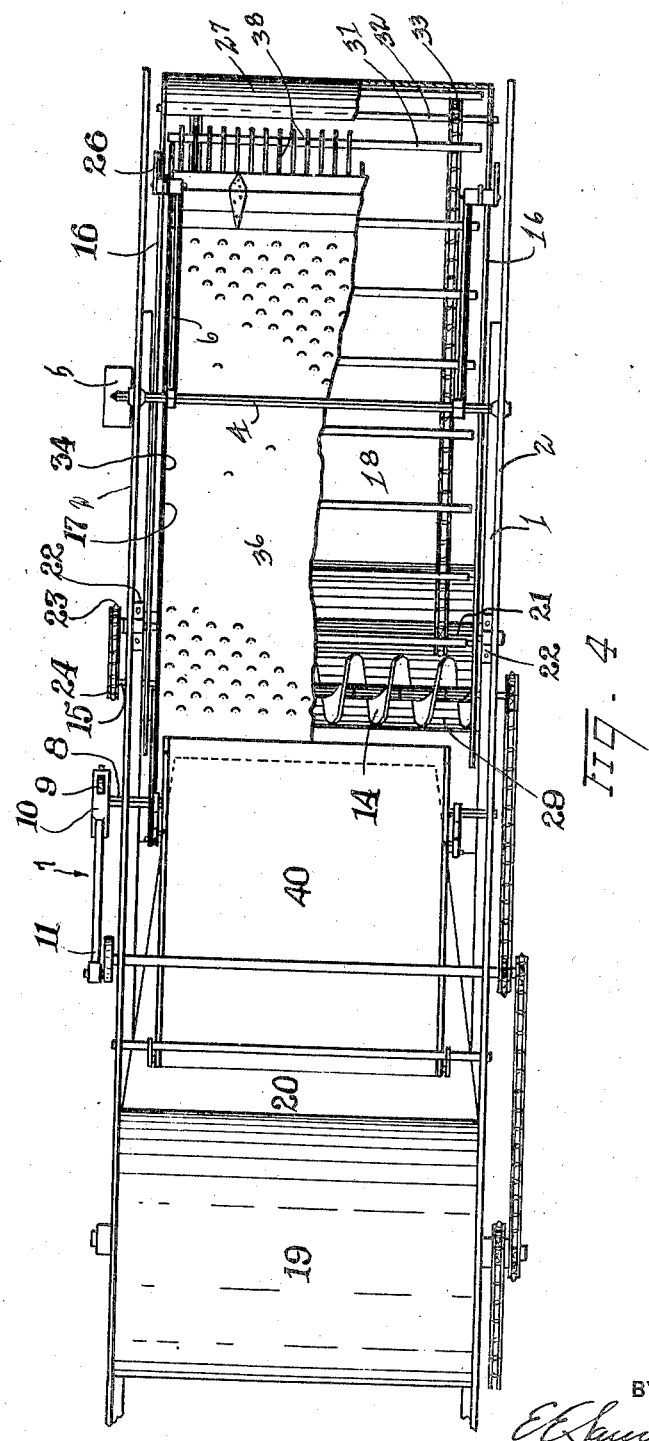

Patented Nov. 1, 1938

2,134,792

UNITED STATES PATENT OFFICE 2,134,792

HARVESTER

James P. McLarry, Dayton, Wash.

Application November 10, 1936, Serial No. 110,029

1 Claim. (Cl. 209—257)

This invention relates to harvesters and has for one of its objects to produce a shoe for harvesters that is positively self cleaning regardless of the inclination of the shoe with respect to the harvester.

Another object of the invention is to provide a levellable shoe that will positively deliver all grain to the grain auger without loss.

A further object of the invention is to provide a shoe and riddle whose only action in common is the levelling action.

A further object of the invention is to produce a shoe that is pivotally mounted and that is well balanced on the levelling device and consequently quicker in response thereto with greater range in levelling.

A further object of the invention is to produce a shoe that by its central pivotal support permits the use of higher side boards completely containing the riddle and preventing loss of grain over the sides thereof during operation.

With these and other objects in view, reference is now had to the accompanying drawings in which Fig. 1 shows in elevation one of the side boards of the shoe.

Fig. 2 is in elevation an inside view of one of the side boards of the riddle.

Fig. 3 is a sectional elevation of the shoe as established in a fragment of a harvester; and Fig. 4 is a plan view showing the device, with part of the riddle broken away.

Having references to the drawings like numerals refer to like parts throughout the several views and the numeral 1 refers to the frame of a harvester to which is suitably attached the side 2 of said harvester, a fragment of one side only being shown in Fig. 3.

Near the rear of the fragmentary drawing shown in Fig. 3 is the levelling device 3 of the harvester, which device consists of a square shaft 4 which traverses the harvester from side to side and which is suitably journalled to rock in said sides in the usual manner (not shown) and this shaft has one end depending exteriorly of the harvester side and is provided on this end with a weight 5 adapted to induce the levelling operation by gravity.

Within the machine and mounted securely on said shaft are arms 6 (one only of which is shown) which extend rearward to support and balance or level the shoe X in a manner to be presently explained.

An agitator 7, shown dotted in this Fig. 3, consists of a square shaft 8 likewise traversing the machine, to one end of which is rigidly secured a shaker arm 9, upon which arm is a slidably adjustable yoke 10 forming part of the pitman 11, the pitman in turn being connected for operation with a crank wheel 12, as outlined by the dotted lines in Fig. 3.

On the interior of the machine and secured to this square shaft 8 is a lever arm 13 which, when agitated by the rocking of the square shaft, by the pitman and through the said shaker arm, will cause a rocking action to said lever arm for a purpose to be presently explained.

Below the frame is shown a representation of a grain auger 14 secured to a shaft 15 which is operably mounted in the machine, in the usual manner, (not shown), and which is operably driven by any suitable operating mechanism of the harvester (not shown).

The shoe X providing the principal subject matter of this invention, and which is associated with the members enumerated above, will now be explained:

The shoe consists of two operably positioned side boards 16 vertically extended to entirely enclose a riddle 17, which will be presently explained, and the side boards 16 are connected by a floor board 18 (thus forming part of the shoe) and in a manner whereby an open boxlike structure is produced having an open top, through which air from a fan 19 may pass during the cleaning operation, and with an open front end through which the spout 20 of the fan projects to direct the blast of air into the shoe.

A transversely positioned drive shaft 21 is journalled in boxes 22 secured at opposite sides of the harvester, and in such a position that sprocket wheel 23 mounted on this shaft will be positioned in operable relation to a complemental auger sprocket wheel 15 mounted on the said auger shaft, the two sprocket wheels being operably connected by the chain belt, represented as at 24, to drive said shaft 21 through the medium of said auger shaft, the latter-named shaft being operated from said operating mechanism.

The side boards 16 of the shoe are provided with oppositely positioned bearings, represented by the circle 25 in Fig. 1, through which the drive shaft 21 is passed in assembling, thus to provide a movable mounting and support for the shoe whereby it may be rocked in a plane perpendicular to the longitudinal axis of said shaft during the levelling operation.

Positioned at the rear of said shoe are shoe levelling links 26 which are pivotally connected to the bottom of the shoe and which are extended substantially vertically for pivotal connection with the shoe levelling arm 6 mounted on the square shaft 4 of the levelling device, this square shaft being rockably mounted in the sides of the harvester for operation by the weight 5 attached to and depending from said square shaft, whereby to automatically level the said shoe about, and on the pivot produced by the said drive shaft 21.

The floor board 18 is provided with less inclination than the usual floor board to reduce the overall height of the shoe due to its relatively high side boards and is further provided with an upwardly curved rearward portion 27, which terminates in continuation of the comb of said riddle, and a depending curved forward portion 28, the latter being formed concentric with said driving shaft 21, and an auger trough 29, associated with said grain auger 14, is provided with a curved rearward portion 30 for register, and forming with said depending curved portion 28 of the floor board, a grain tight communicating and flexible passageway between said shoe and said auger for the cleaned grain which is deposited on said floor board during the cleaning operation.

To positively move the grain on the floor board into the grain auger, a slotted endless belt conveyor 31 is provided and to provide for this conveyor a shaft 32 is operably mounted in the rear end of the shoe and centrally within the upwardly curved portion thereof and the conveyor is mounted on sprocket wheels 33 on this last-named shaft and the drive shaft, in the usual manner of such mounting, and the conveyor is positioned that its sticks may pass along said floor board 18 to force the movement of the grain.

Associated with the shoe is the riddle 17 which consists of relatively low side boards 34 having securely attached to the inside thereof and at their lower edge an angle iron supporting member 35 wherewith to support the riddle, which consists in turn of a screen, represented as at 36, which screen is mounted on a frame 37, supported by said angle iron, and to the rear end of which is hingedly attached the usual comb 38, which when the screen is assembled in the riddle positions the comb to direct and pass the chaff over the upturned curved rearward portion 27 of said floor board.

The riddle while contained in said shoe is supported independent of the shoe by the said agitator at its forward end while its rearward end is supported by said arm of the levelling device, which arm is connected pivotally to the riddle by a connecting link 39 disposed for the purpose.

By this means it is now apparent that the riddle may be agitated longitudinally independent of any movement of the shoe, and the screen of the riddle is so positioned in the shoe that air or wind coming from the fan and its attendant spout will pass through the said screen, forcing the lighter material back and out over the rear curved end of said shoe.

In operation the threshed grain, after its passage through the preliminary cleaning mechanism, will be deposited on the grain board 40, which is likewise pivotally supported and connected with the agitator mechanism, as shown, whereby by agitation and the inclination of this board the grain will move rearward to fall onto the said screen of the riddle, and as this is agitated longitudinally the separation above mentioned will take place.

As soon as the grain drops through the screen of the riddle, it will fall between the sticks of the conveyor to rest momentarily upon the substantially level floor of said shoe, and from thence will be forced by the movement of said conveyor, in synchronized relation to the speed of the auger, downward past the flexible joint provided between the shoe and the auger trough where the grain will be deposited into the auger for movement by that member to its destination.

By pivoting the shoe upon the drive shaft 21 the shoe is more evenly balanced and therefore will respond to the action of the levelling device more quickly than the present day shoe.

In passing over uneven grounds it is obvious that if the front wheels (not shown) encounter a raised place in the ground, or if its rear wheels drop into a depression, that such raise or depression may cause damage to the shoe by striking the ground in the passage of the machine thereover. Hence, by decreasing the overall height of the shoe by reduction of the inclination of its floor board, considerable range of movement is added thereto for the safety of the shoe and without in any way effecting the operation of the riddle.

Having thus described my invention, I claim:

In a harvester, the combination with a levellable and reciprocatable riddle and the grain auger of said harvester, of a transversely positioned shaft operably connected to said auger, a shoe pivotally and levellably mounted on said shaft and comprising side boards extended above said riddle, and a floor board integral with said side boards, said floor board being provided with a curved rearward end terminating in continuation of the comb of said riddle, and provided at its forward end with a curved portion slidingly contacting a like curved lip on the trough of said auger providing therewith a flexible and graintight coupling, and means operable by said transverse shaft to move the grain kernels over the level floor of said shoe and into said auger in synchronized relation with the speed of said auger.

JAMES P. McLARRY.